(12) United States Patent
Sawanoi

(10) Patent No.: US 9,377,344 B2
(45) Date of Patent: Jun. 28, 2016

(54) ELECTRONIC SPHYGMOMANOMETER AND BLOOD PRESSURE MEASUREMENT METHOD

(75) Inventor: Yukiya Sawanoi, Nara (JP)

(73) Assignee: OMRON HEALTHCARE Co., Ltd., Kyoto (JP)

( * ) Notice: Subject to any disclaimer, the term of this patent is extended or adjusted under 35 U.S.C. 154(b) by 277 days.

(21) Appl. No.: 13/168,364

(22) Filed: Jun. 24, 2011

(65) Prior Publication Data

US 2011/0251500 A1 Oct. 13, 2011

Related U.S. Application Data

(63) Continuation of application No. PCT/JP2009/007230, filed on Dec. 25, 2009.

(30) Foreign Application Priority Data

Dec. 26, 2008 (JP) .................................. 2008-333402

(51) Int. Cl.
*A61B 5/02* (2006.01)
*G01G 19/50* (2006.01)
*G01G 23/16* (2006.01)

(52) U.S. Cl.
CPC ................ *G01G 19/50* (2013.01); *G01G 23/16* (2013.01)

(58) Field of Classification Search
CPC ....... G01G 19/50; G01G 23/16; A61B 5/021; A61B 5/022; A61B 5/02208; A61B 5/02225; A61B 5/023; A61B 5/0234; A61B 5/02233
USPC .......... 600/483, 485, 490, 494, 498, 499, 502
See application file for complete search history.

(56) References Cited

U.S. PATENT DOCUMENTS 4,240,297 A * 12/1980 Speidel ........................... 73/711
4,860,760 A * 8/1989 Miyawaki et al. ............ 600/493
(Continued)

FOREIGN PATENT DOCUMENTS

| JP | 05-042115 A | 2/1993 | |
| JP | 2936815 | * 6/1999 | .......... A61B 5/0255 |
| JP | 3149873 B2 | 3/2001 | |
| JP | 2005-185681 A | 7/2005 | |
| WO | 2008/114474 A1 | 9/2008 | |

OTHER PUBLICATIONS

Patent Abstracts of Japan, Publication No. 2005-185681, Publication Date: Jul. 14, 2005, 1 page.
(Continued)

*Primary Examiner* — Michael Kahelin
*Assistant Examiner* — Tho Tran
(74) *Attorney, Agent, or Firm* — Osha Liang LLP

(57) ABSTRACT

An electronic sphygmomanometer includes a cuff to be attached to a blood pressure measurement site, a pump and a valve for adjusting a pressure to apply on the cuff, a pressure sensor for detecting the pressure of the cuff, a central processing unit (CPU) for calculating a blood pressure value from the cuff pressure, a memory for recording the blood pressure value, and an operation unit for performing a blood pressure measurement. Further, the CPU acquires information on an application voltage of the valve or the pump at a time of blood pressure measurement, and the information on the application voltage is stored in the memory. The CPU corrects the application voltage so that control of the valve or the pump is carried out based on the application voltage stored in the memory.

8 Claims, 7 Drawing Sheets

(56) References Cited

U.S. PATENT DOCUMENTS

| | | | |
|---|---|---|---|
| 4,880,013 A * | 11/1989 | Chio | 600/494 |
| 5,042,496 A * | 8/1991 | Sjonell | 600/490 |
| 5,054,494 A * | 10/1991 | Lazzaro et al. | 600/490 |
| 7,118,535 B2 * | 10/2006 | Sawanoi et al. | 600/490 |
| 2003/0149369 A1 * | 8/2003 | Gallant et al. | 600/485 |
| 2008/0119745 A1 * | 5/2008 | Yang et al. | 600/493 |
| 2009/0018453 A1 * | 1/2009 | Banet et al. | 600/493 |
| 2009/0163823 A1 * | 6/2009 | Takahashi et al. | 600/490 |

OTHER PUBLICATIONS

Patent Abstracts of Japan, Publication No. 05-042115, Publication Date: Feb. 23, 1993, 1 page.

International Search Report issued in PCT/JP2009/007230 mailed on Feb. 16, 2010 and English translation thereof, 5 pages.

* cited by examiner

ELECTRONIC SPHYGMOMANOMETER AND BLOOD PRESSURE MEASUREMENT METHOD

TECHNICAL FIELD

The present invention relates to an electronic sphygmomanometer including a cuff to be attached to a blood pressure measurement site and blood pressure calculation means for calculating a blood pressure value from a cuff pressure, and a blood pressure measuring method using the same.

BACKGROUND ART

A blood pressure is one type of index for analyzing a circulatory disease. Performing risk analysis based on the blood pressure is effective in preventing cardiovascular related disease such as apoplexy, cardiac arrest, and cardiac infarction. Conventionally, a diagnosis for performing the risk analysis is made from the blood pressure (occasional blood pressure) measured in medical institutions at the time of hospital visits and checkups. However, it is recognized from recent research that the blood pressure (home blood pressure) measured at home is more useful in diagnosing the circulatory disease than the occasional blood pressure. Accompanied therewith, the sphygmomanometer used at home is being widely used.

Most of the electronic sphygmomanometers currently being widely used use the blood pressure calculation algorithm of the oscillometric method or the microphone method.

In the oscillometric method, the change in arterial volume that occurs when the cuff pressure is pressurized up to a predetermined pressure (e.g., systolic blood pressure+30 mmHg) and then gradually depressurized at a predetermined speed (depressurization rate) is detected as a pressure pulse wave amplitude, and a predetermined algorithm is applied on the change in the pressure pulse wave amplitude to calculate a blood pressure value. The change in arterial volume that occurs when gradually pressurizing the cuff pressure at a predetermined speed (pressurization rate) may be detected as a pressure pulse wave amplitude, and a predetermined algorithm may be applied on the change in the pressure pulse wave amplitude to calculate a blood pressure value.

In the microphone method, the occurrence, attenuation, and disappearance of a Korotkoff sound that occurs when the cuff pressure is pressurized up to a predetermined pressure (e.g., systolic blood pressure+30 mmHg), and then gradually depressurized at a predetermined speed (depressurization rate) are detected with a microphone arranged in the cuff to determine the systolic blood pressure and the diastolic blood pressure.

In either blood pressure calculation method, the depressurization rate and the pressurization rate need to be set such that information on the pressure pulse wave amplitude or the Kortkoff sound can be fully obtained.

Specifically, the depressurization rate or the pressurization rate needs to be set according to the pulse rate of a person to be measured. In current sphygmomanometers, with respect to the depressurization rate and the pressurization rate, methods such as 1. setting the depressurization rate or the pressurization rate (e.g., 4 mmHg/sec etc.) sufficiently slow so that the pressure pulse wave amplitude information or the Kortkoff sound can be fully obtained;

2. estimating at least one or more of the systolic blood pressure, the diastolic blood pressure, or the pulse rate during pressurization, and setting the depressurization rate most suitable for the person to be measured based on such information (see Patent Document 1); and 3. setting the depressurization rate based on the average value of the pulse rates up to the previous measurement (see Patent Document 2) are adopted.

Patent Document 1: Japanese Patent Publication No. 3149873

Patent Document 2: Japanese Unexamined Patent Publication No. 2005-185681

SUMMARY OF INVENTION

The depressurization rate or the pressurization rate in the sphygmomanometer is determined by an air flow rate (hereinafter referred to as cuff compliance) necessary for changing the pressure in the cuff (hereinafter referred to as cuff pressure) by 1 mmHg (FIG. 5), which is one of the properties of the cuff, and a flow rate property of the valve (depressurization rate) or the pump (pressurization rate) (FIG. 6, FIG. 7). Therefore, the control corresponding to the cuff compliance is required to control at an optimum depressurization rate and pressurization rate.

Assuming the cuff compliance is c (ml/mmHg), the flow rate property $Qv$ (ml/sec) of the valve necessary for controlling the cuff pressure at the depressurization rate $v\_def$ (mmHg/sec) is defined as, $$Qv(\text{ml/sec}) = c(\text{ml/mmHg})/v\_def(\text{mmHg/sec}) \quad \text{[Equation 1]}$$

Similarly, the flow rate property $Qp$ (ml/sec) of the pump necessary for controlling the cuff pressure at the pressurization rate $v\_inf$ (mmHg/sec) is defined as, $$Qp(\text{ml/sec}) = c(\text{ml/mmHg})/v\_inf(\text{mmHg/sec}) \quad \text{[Equation 2]}$$

As shown in FIG. 5, the cuff compliance changes by the cuff pressure, the peripheral length and quality (hardness) of the measurement site of the user, the winding manner of the cuff, the ambient environment (temperature, humidity), and the like. Therefore, Qv or Qp defined in (equation 1) and (equation 2) is not constant, and needs to be changed dependent on the cuff pressure or the user. As shown in FIG. 6 and FIG. 7, Qv or Qp can be controlled by a voltage to be applied on the valve or the pump.

Considering the prior art technique disclosed in Patent Document 1, a control corresponding to the cuff compliance is still required to control at the depressurization rate set based on each numerical value estimated during pressurization, as described above. However, in Patent Document 1, the exhaust flow rate at the time of depressurization is determined by the cuff compliance at the time point of the end of pressurization, and a constant is experimentally determined in advance. Thus, the exhaust flow rate actually needs to be controlled while monitoring the depressurization rate during depressurization.

In other words, in the conventional technique disclosed in Patent Document 1, a feedback control of acquiring the amount of change in the cuff pressure every constant time during depressurization, and controlling the application voltage of the valve is required.

In the conventional technique disclosed in Patent Document 2 as well, a control corresponding to the cuff compliance is required for the control at the depressurization rate set based on the pulse rate up to the previous measurement, and the application voltage of the valve must be feedback controlled.

When using the feedback control, the time (hereinafter referred to as initial control time) until reaching the desired depressurization rate or pressurization rate is necessary.

Looking at the operation of the depressurization control, the valve is driven at the voltage set in advance after the cuff pressure is pressurized to a predetermined pressure. The voltage to apply to the valve in this case is a voltage of the flow rate property that becomes a speed sufficiently slower than the minimum value of the depressurization rate that can be set with respect to any user to prevent excessive control.

Therefore, the depressurization starts at a very slow depressurization rate at the beginning of depressurization. Thereafter, the feedback control is carried out while gradually raising the application voltage so as to reach the desired depressurization rate while acquiring the amount of change of the cuff pressure at a constant time interval.

The amount of increase of the application voltage in this case also needs to be a sufficiently small value so as to enable the feedback control.

Furthermore, because the depressurization rate is not uniform during the initial control time, the pulse wave information acquiring during such a period has low reliability and cannot be used for the blood pressure calculation. Thus, the cuff pressure for the amount depressurized during the initial control time needs to be added to the pressurization value.

As such, a longer depressurization time and an increase in the pressurization value occur due to the necessity of the initial time in the depressurization control by the feedback control, which leads to an increase in the constraining feeling in the blood pressure measurement.

Patent Document 2 discloses determining the pressurization value for the next time based on the systolic blood pressure value obtained from the most recent (previous) measurement result or a plurality of measurement results. In such a case, however, the application voltage of the pump needs to be feedback controlled for the cuff pressure to reach the determined pressurization value. As a result, the pressurization time becomes longer in the pressurization control as well due to reasons similar to the case of the depressurization control, which leads to an increase in the constraining feeling in the blood pressure measurement.

Therefore, one or more embodiments of the present invention provides a sphygmomanometer and a blood pressure measurement method enabling an optimum pressurization and depressurization control for each user by storing information of the application voltage of the valve or the pump at the time of the blood pressure measurement in the recording means and correcting the application voltage to carry out the control of the valve or the pump based on the application voltage stored in the recording means, achieving shorter measurement time and reduction of unnecessary pressurization, and achieving reduction in the constraining feeling in the blood pressure measurement, and enhances the satisfaction level of the user.

According to one or more embodiments of the present invention, an electronic sphygmomanometer includes a cuff to be attached to a blood pressure measurement site; pressurization and depressurization means for adjusting pressure to apply on the cuff; pressure detection means for detecting the pressure of the cuff; blood pressure calculation means for calculating a blood pressure value from the cuff pressure; recording means for recording the blood pressure value; and operation means for performing operations such as blood pressure measurement; the electronic sphygmomanometer further including input means for inputting user information; information acquiring means for acquiring information on an application voltage of a valve or a pump at time of blood pressure measurement, the storage means being configured to store the information on the application voltage of the valve or the pump at the time of blood pressure measurement in association with the user information when the information on the application voltage of the valve or the pump at the time of blood pressure measurement is acquired by the information acquiring means; and correction means for correcting the application voltage so that control of the valve or the pump is carried out based on an application voltage in a case where the application voltage associated with the user information is stored in the storage means when calculating the blood pressure with the blood pressure calculating means.

The operation means includes input means for inputting the user information, and the application voltage of the valve or the pump at the time of the blood pressure measurement stored in the recording means can be stored in the recording means in association with the user information input by the input means.

The user information may be an index representing the peripheral length of the measurement site or the quality of the measurement site.

The control of the valve or the pump can be controlled based on a statistical value of a plurality of recorded application voltages.

According to one or more embodiments of the present invention, an optimum pressurization and depressurization control can be carried out for every user. The cuff compliance does not need to be measured and the feedback control also becomes necessary, and as a result, the measurement time can be reduced, the unnecessary pressurization can be reduced, and the constraining feeling in the blood pressure measurement can be reduced.

Further, according to one or more embodiments of the present invention, the recording means is configured to store the application voltage of the valve or the pump at the time of the blood pressure measurement in association with the cuff pressure corresponding to each application voltage.

Further, according to one or more embodiments of the present invention, the recording means is configured to store the application voltage of the valve or the pump at the time of the blood pressure measurement in association with a depressurization rate and/or pressurization rate.

Further, according to one or more embodiments of the present invention, the recording means is configured to store the application voltage of the valve or the pump at the time of the blood pressure measurement in association with an elapsed time in which the application voltage is applied.

Further, according to one or more embodiments of the present invention, the recording means is configured to store the application voltage of the valve or the pump at the time of the blood pressure measurement in association with user information related to a peripheral length of a measurement site or a quality of a measurement site; and in a case where the user information differs from that stored in the recording means in a measurement for this time, the correction means corrects the application voltage based on the user information, and overwrites the corrected application voltage to store in the recording means.

One or more embodiments of the present invention provides a blood pressure measurement method for adjusting a pressure to apply on a cuff attached to a blood pressure measurement site with a pressurization and depressurization means, and calculating a blood pressure value with blood pressure calculation means based on a cuff pressure detected by pressure detection means; the blood pressure measurement method including the steps of accepting input of user information by input means; acquiring information on an application voltage of a valve or a pump at time of blood pressure measurement with information acquiring means; storing the information on the application voltage of the valve or the pump at the time of blood pressure measurement in a storage means in association with the user information when the information on the application voltage of the valve or the pump at the time of blood pressure measurement is acquired by the information acquiring means; and correcting the application voltage so that control of the valve or the pump is carried out based on an application voltage in a case where the information on the application voltage associated with the user information is stored in the storage means when calculating the blood pressure with the blood pressure calculating means.

According to one or more embodiments of the present invention, an optimum pressurization and depressurization control can be carried out for every user, the cuff compliance does not need to be measured and the feedback control also becomes necessary, and as a result, the process that shortens the measurement time, reduces the unnecessary pressurization, and reduces the constraining feeling in the blood pressure measurement can be executed.

Further, according to one or more embodiments of the present invention, the step of correcting by the correction means includes storing the application voltage of the valve or the pump at the time of the blood pressure measurement in the recording means in association with the cuff pressure corresponding to each application voltage.

Further, according to one or more embodiments of the present invention, the step of correcting by the correction means includes storing the application voltage of the valve or the pump at the time of the blood pressure measurement in the recording means in association with a depressurization rate and/or pressurization rate.

Further, according to one or more embodiments of the present invention, the step of correcting by the correction means includes storing the application voltage of the valve or the pump at the time of the blood pressure measurement in the recording means in association with an elapsed time in which the application voltage is applied.

Further, according to one or more embodiments of the present invention, the step of correcting by the correction means includes storing the application voltage of the valve or the pump at the time of the blood pressure measurement in association with user information related to a peripheral length of a measurement site or a quality of a measurement site; and correcting the application voltage based on the user information in a case where the user information differs from that stored in the recording means in a measurement for this time, and overwriting the corrected information of the application voltage to store in the recording means.

According to one or more embodiments of the present invention, the electronic sphygmomanometer and the blood pressure measurement method enabling an optimum pressurization and depressurization control for every user, and capable of shortening the measurement time, reducing the unnecessary pressurization, and reducing the constraining feeling in the blood pressure measurement can be provided. Further, the satisfaction level of the user can be enhanced.

DETAILED DESCRIPTION OF INVENTION

Embodiments of the present invention will be hereinafter described with the drawings.

Figure 1:
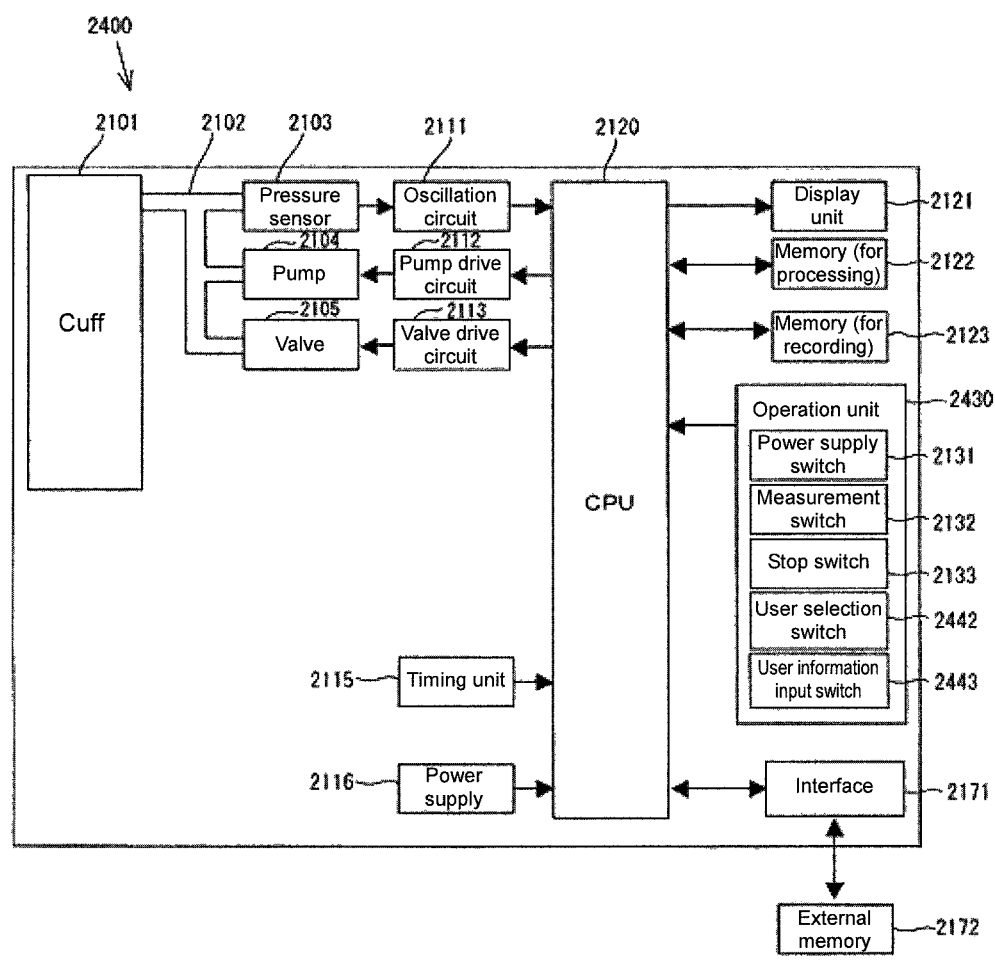
FIG. 1 is a block diagram showing a configuration of an electronic sphygmomanometer according to one or more embodiments of the present invention.

As shown in FIG. 1, an electronic sphygmomanometer 2400 according to one or more embodiments of the present invention includes a cuff 2101, an air tube 2102, a pressure sensor 2103, a pump 2104, a valve 2105, an oscillation circuit 2111, a pump drive circuit 2112, a valve drive circuit 2113, a timing unit 2115, a power supply 2116, a CPU 2120, a display unit 2121, a memory (for processing) 2122, a memory (for recording) 2123, an operation unit 2430, an interface 2171, and an external memory 2172.

FIG. 1 is a block diagram showing a configuration of the electronic sphygmomanometer 2400 according to one or more embodiments of the present invention.

The cuff 2101 is a band shaped member that is connected to the air tube 2102 and that is attached to a blood pressure measurement site of the user to pressurize by air pressure.

The pressure sensor 2103 is an electrostatic capacitance type pressure sensor, in which a capacitance value changes according to the pressure in the cuff (cuff pressure).

The pump 2104 and the valve 2105 apply pressure to the cuff and adjust (control) the pressure in the cuff.

The oscillation circuit 2111 outputs a signal of the frequency corresponding to the capacitance value of the pressure sensor 2103.

The pump drive circuit 2112 and the valve drive circuit 2113 drive the pump 2104 and the valve 2105, respectively.

The timing unit 2115 is a device for timing the current date and time, and transmitting the timed date and time to the CPU 2120 as necessary.

The power supply 2116 supplies power to each configuring unit.

The CPU 2120 executes the control of the pump 2104, the valve 2105, the display unit 2121, the memories 2122, 2123, the operation unit 2130, and the interface 2171, the blood pressure determination process and the management of the recording values.

The display unit 2121 is configured by a display device such as a liquid crystal screen, and displays the blood pressure value according to a signal transmitted from the CPU 2120.

The memory (for processing) 2122 stores a control program of the sphygmomanometer, or the like.

The memory (for recording) 2123 stores the blood pressure value, and also stores the date and time, the user, and the measurement value (blood pressure value, cuff pressure, depressurization rate, pressurization rate, peripheral length and quality of the measurement site) as well as the application voltage of the pump 2104 and the valve 2105 during the measurement in association.

The operation unit 2430 is configured by a power supply switch 2131, a measurement switch 2132, a stop switch 2133, a user selection switch 2442, and a user information input switch 2443, permits the operation input such as power ON/OFF of the sphygmomanometer and start of the measurement, and transmits the inputted input signal to the CPU 2120.

The interface 2171 records/reads out the blood pressure to and from the external memory 2172 according to the control of the CPU 2120.

The blood pressure measurement operation using the electronic sphygmomanometer 2400 configured as above will be described according to the flowchart of FIG. 2.

Figure 2:
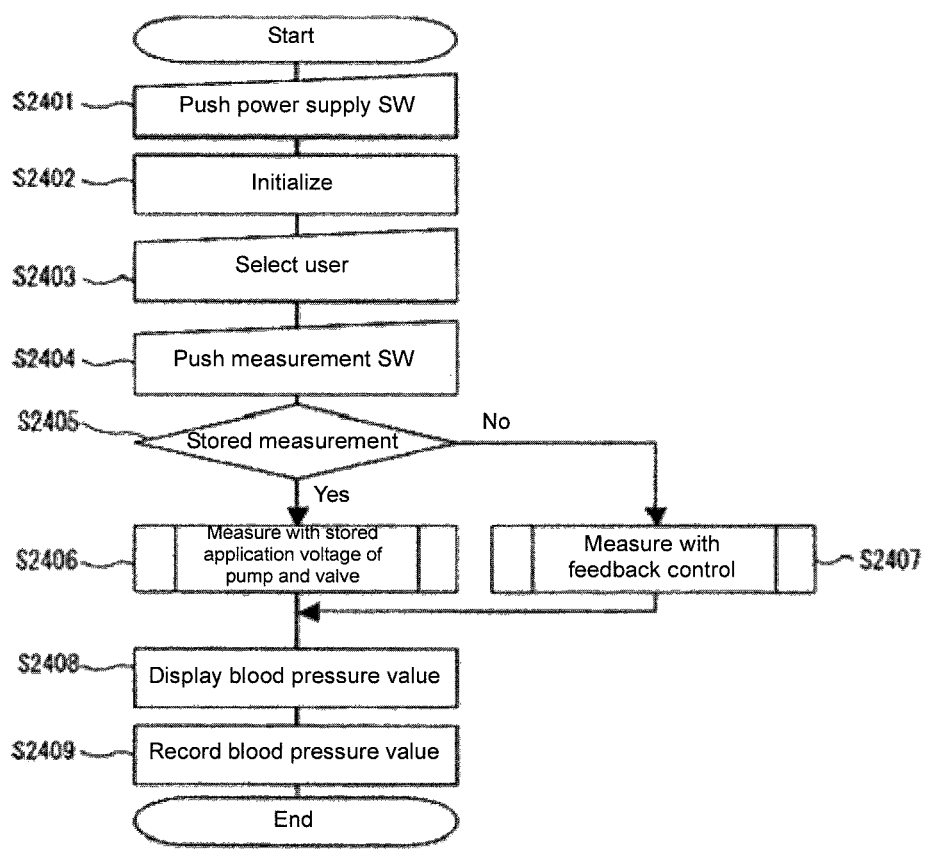
FIG. 2 is a flowchart showing an example of a blood pressure measurement operation according to one or more embodiments of the present invention.

FIG. 2 is a flowchart showing the blood pressure measurement operation according to one or more embodiments of the present invention.

First, when the power supply is turned ON by the operation of the power supply switch 2131 (step S2401), the CPU 2120 performs the 0 mmHg adjustment of the pressure sensor 2103 (step S2402).

After the initialization process is terminated, the user whose blood pressure is to be measured is selected (step S2403), and the measurement switch is pushed (step S2404), so that the CPU 2120 checks the measurement record of the selected user (step S2405). If there is a measurement record (step S2405:7: YES), the CPU 2120 reads out the recorded application voltage of the pump 2104 and the valve 2105, and carries out the pressurization and depressurization control and the blood pressure measurement with such a voltage (step S2406). If there is no measurement record (step S2405: NO), the CPU 2120 carries out the pressurization and depressurization control and the blood pressure measurement with the feedback control (step S2408).

After the blood pressure measurement is completed, the CPU 2120 displays the blood pressure value (step S2408), and stores the blood pressure value, the measurement date and time, the user, and the application voltage to the pump 2104 and the valve 2105 during pressurization and depressurization in the memory (for recording) 2123 (step S2409).

The process of "measuring with the stored application voltage of the pump 2104 and the valve 2105" executed in step S2406 of FIG. 2 will be described using the flowchart of FIG. 3.

The CPU 2120 drives the pump 2104 with the stored application voltage of the pump 2104 (step S2411), and pressurizes the cuff pressure up to a predetermined pressure (step S2412).

The predetermined pressure may be the pressure (e.g., 180 mmHg) set in advance). The systolic blood pressure may be estimated from the pulse wave signal obtained during pressurization, and the pressure obtained by adding a constant pressure (e.g., 40 mmHg) to the estimated systolic blood pressure may be set as the predetermined pressure.

The pressure obtained by adding a constant pressure (e.g., 40 mmHg) to the stored systolic blood pressure may be set. The systolic blood pressure to use in this case is an average value, a maximum value, a median value, or the like of the stored values of all the stored systolic blood pressures or a plurality of (e.g., five times) immediate measured stored values.

The voltage is applied to the pump 2104 in an elapsed time associated with the stored application voltage.

After the cuff pressure is pressurized up to the predetermined pressure, the CPU 2120 stops the drive of the pump 2104, drives the valve 2105 with the stored application voltage of the valve 2105, and gradually depressurizes the cuff pressure (step S2413). The CPU 2120 then extracts the pressure change component involved in the arterial volume change superimposed on the cuff pressure obtained during depressurization, and calculates the blood pressure through a predetermined calculation (steps S2414 to S2415).

As shown in step S2407 of FIG. 2, the measurement is carried out in feedback control in the first measurement and when the user is changed.

Figure 4:
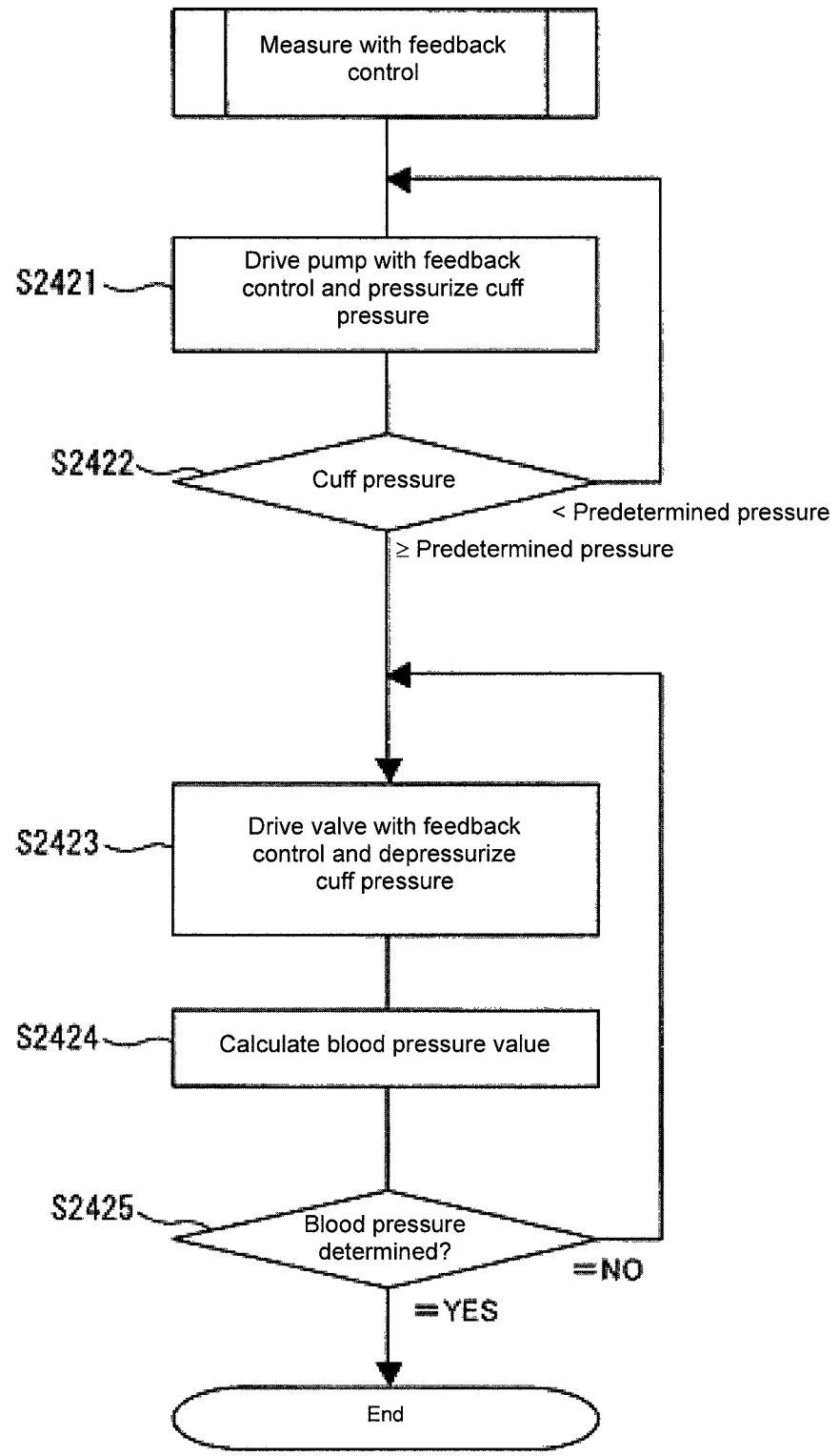
FIG. 4 is a flowchart showing an example of a blood pressure measurement operation according to one or more embodiments of the present invention.
Figure 5:
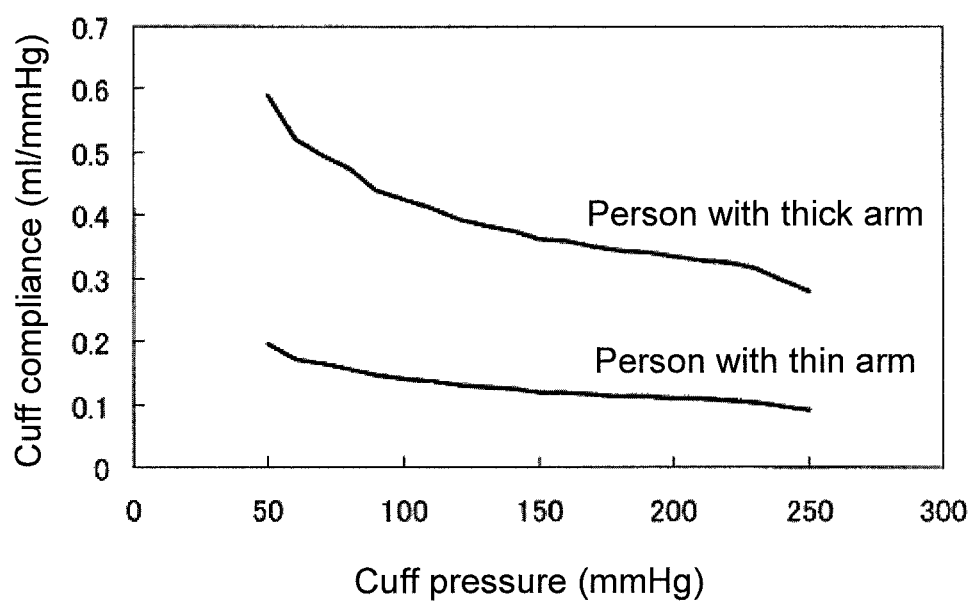
FIG. 5 is a graph showing the property (cuff compliance) example of the cuff.
Figure 6:
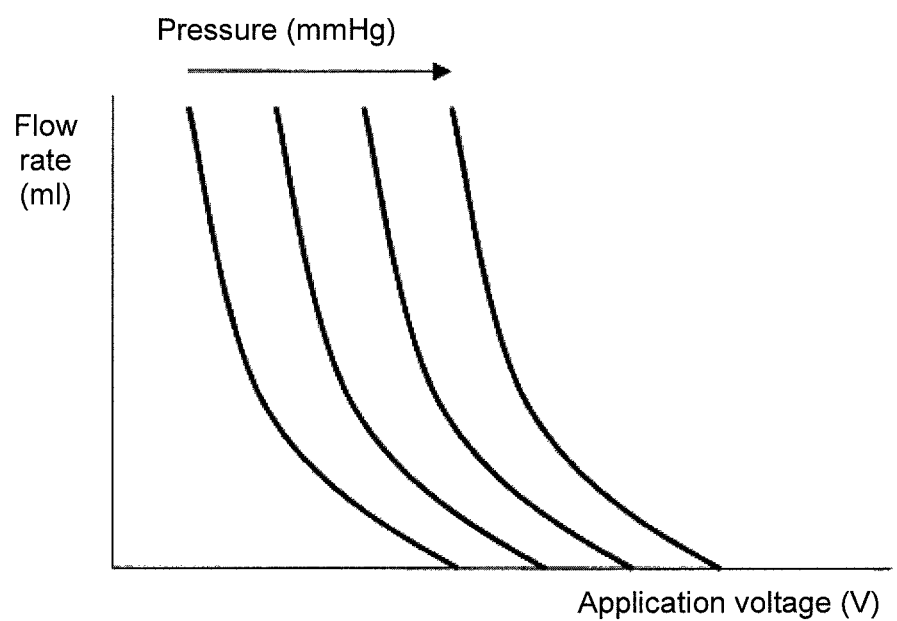
FIG. 6 is a graph showing the flow rate property of the valve.
Figure 7:
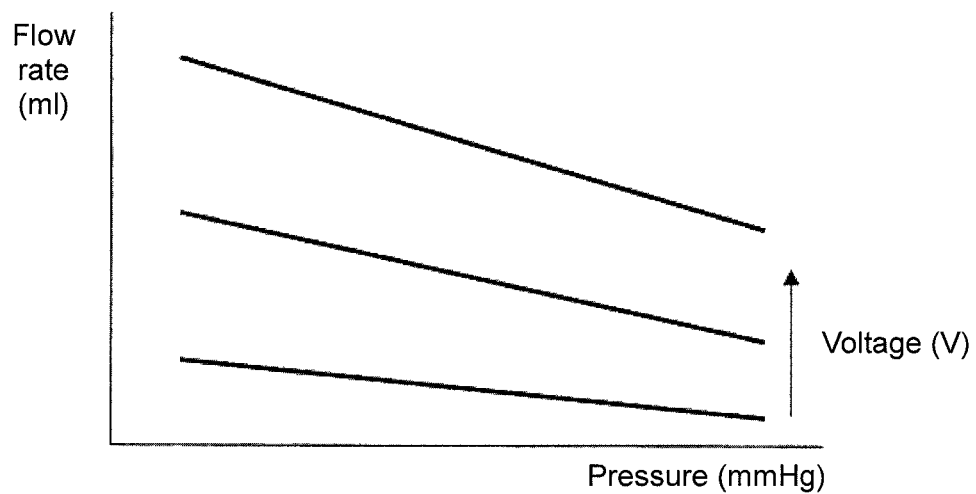
FIG. 7 is a graph showing the flow rate property of the pump.

The process of "measuring in feedback control" executed in step S2407 of FIG. 2 will be described using the flowchart of FIG. 4.

The CPU 2120 drives the pump 2104 with the feedback control (step S2421), and pressurizes the cuff pressure up to a predetermined pressure (step S2422).

The predetermined pressure may be a pressure (e.g., 180 mmHg) set in advance. The predetermined pressure may be a pressure obtained by estimating the systolic blood pressure by the pulse wave signal obtained during pressurization, and adding a constant pressure (e.g., 40 mmHg) to the estimated systolic blood pressure.

After pressurizing the cuff pressure up to the predetermined pressure, the CPU 2120 stops the drive of the pump 2104, drives the valve 2105 with the feedback control, and gradually depressurizes the cuff pressure (step S2423). The CPU 2120 then extracts the component of the pressure change involved in the volume change of the artery superimposed on the cuff pressure obtained during depressurization, and calculates the blood pressure through a predetermined calculation (steps S2424 to S2425).

Figure 3:
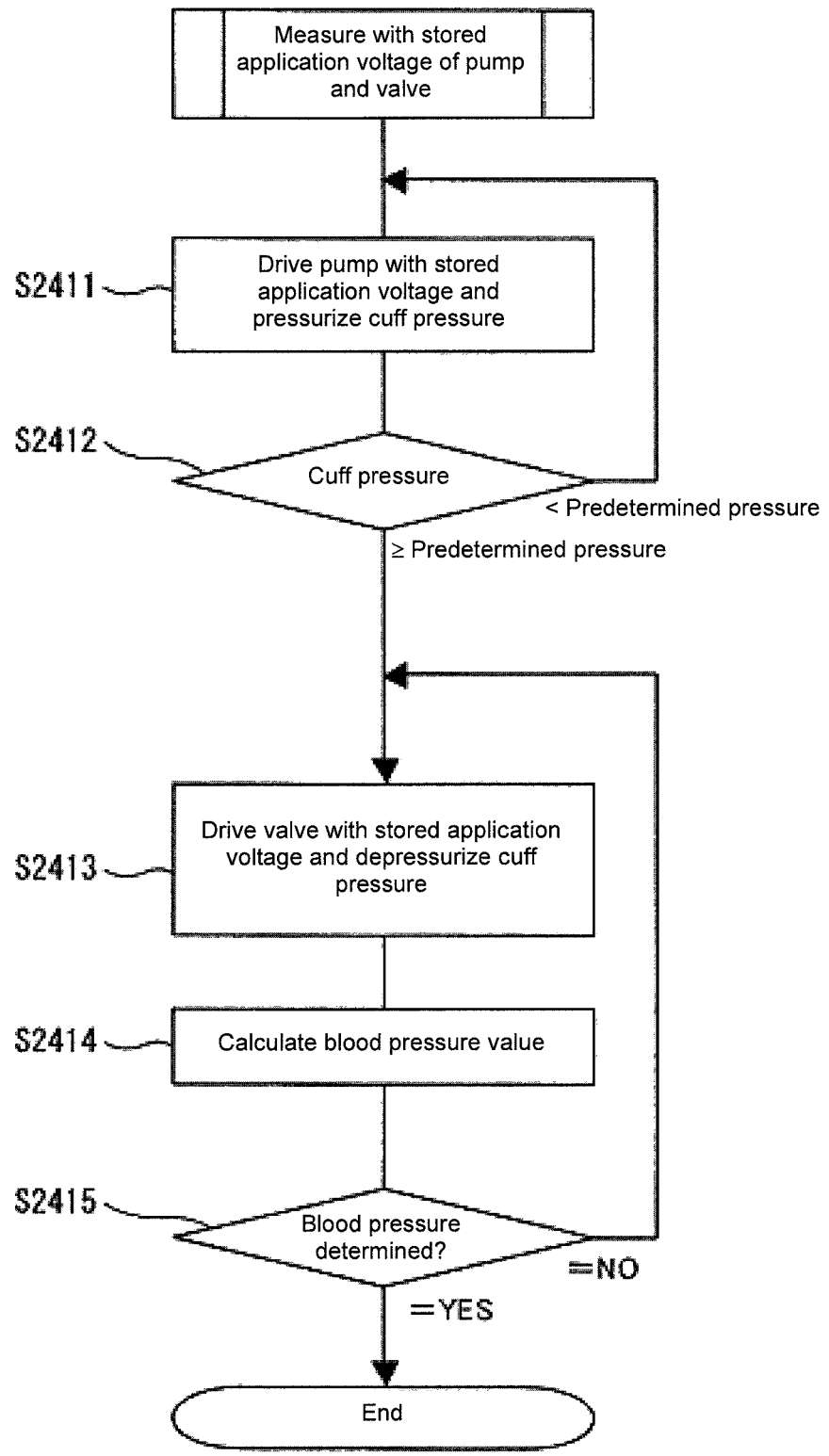
FIG. 3 is a flowchart showing an example of a blood pressure measurement operation according to one or more embodiments of the present invention.

If the stored application voltage is stored in association with the cuff pressure corresponding to each application voltage (e.g., application voltage is stored in association with the cuff pressure for every constant interval), the CPU 2120 drives the pump 2104 or the valve 2105 based on the application voltage associated with the cuff pressure with the change in the cuff pressure in steps S2411, S2413 in FIG. 3.

The pressurization and depressurization control suited for the user individually can be more appropriately carried out according to the cuff pressure by storing the application voltage in the memory 2123 in association with the cuff pressure.

According to one or more embodiments of the present invention, in a case where the application voltage is stored in association with the depressurization rate or the pressurization rate, and the pressurization rate and the depressurization rate required in the measurement for this time are different from the storage value, the CPU 2120 adjusts the application voltage through a predetermined calculation that is necessary when carrying out an accurate blood pressure measurement as described below.

The pulse wave information of a predetermined number or more needs to be ensured in a pressure range (pulse pressure range) of the systolic blood pressure and the diastolic blood pressure when carrying out an accurate blood pressure measurement, where such a pulse wave number is described as five or more in Patent Document 1 (example [0020]).

According to one or more embodiments of the present invention, the pressurization and depressurization rate is about 4 mmHg/pulse.

In either case, the pressurization and depressurization rates depend on the pulse rate, where pressurization and depressurization rates need to be adjusted if the pulse rate at the time of the measurement at the recorded application voltage differs from the current pulse rate.

The depressurization rate when ensuring a predetermined pulse wave number in the pulse pressure range is as expressed below with reference to equation (5) of Patent Document 1.

$$v=(SBP-DBP) \times HR \div N \qquad \text{[Equation 3]}$$

Here, v is the depressurization rate, SBP is the systolic blood pressure, DBP is the diastolic blood pressure, HR is the pulse rate, and N is the pulse wave number to ensure.

Therefore, if the pulse rate differs, the depressurization rate is to be adjusted according to the ratio thereof. The depressurization rate can be adjusted by the application voltage, where the CPU 2120 adjusts the application voltage using the following equation.

$$V\_cur = V\_m \times (HR\_cur \div HR\_m \times \alpha) \quad \text{[Equation 4]}$$

Here, V_cur is the application voltage of this time, V_m is the recorded application voltage, HR_cur is the pulse rate of this time, HR_m is the recorded pulse rate, and $\alpha$ is a constant.

HR_cur in this case is to be estimated from the pulse wave information obtained during the pressurization. According to one or more embodiments of the present invention, the systolic blood pressure and the diastolic blood pressure may be simultaneously estimated during the pressurization, and then the application voltage may be adjusted.

Similarly, when the pressurization and depressurization rate is 4 mmHg/pulse, the application voltage is to be adjusted as expressed in (equation 4) by the ratio of the recorded pulse rate and the pulse rate for this time.

In the case of the pressurization measurement, the pulse wave information for a few seconds is acquired before the start of measurement, and then the pulse rate is to be estimated.

Therefore, the pressurization and depressurization control suited for the user individual can be more appropriately carried out according to the depressurization rate and the pressurization rate by storing the application voltage in the memory 2123 in association with the depressurization rate and the pressurization rate.

According to one or more embodiments of the present invention, if the application voltage is stored in association with the user information such as the peripheral length and the quality of the measurement site, the application voltage is adjusted based on the user information through a predetermined calculation described above when the user information (peripheral length and quality of measurement site) differs from the storage value in the measurement of this time.

The numerical values of body fat percentage, subcutaneous fat percentage, and BMI are used for the quality of the measurement site.

As apparent from (equation 1) and (equation 2), the flow rate of the pump and the valve changes by the cuff compliance. The application voltage also changes by the cuff compliance because the flow rate of the pump and the valve is defined by the application voltage. The application voltage may be corrected as in (equation 5) because the cuff compliance changes dependent on the arm periphery and the quality of the measurement site. The application voltage corrected by (equation 5) is then stored in the memory 2123 while overwriting the application voltage before the correction.

$$V\_cur = V\_m \times (L\_cur \div L\_m \times \beta) \quad \text{[Equation 5]}$$

Here, V_cur is the application voltage of this time, V_m is the recorded application voltage, L_cur is the peripheral length of this time, L_m is the recorded peripheral length, and $\beta$ is a constant.

The correction can be carried out with a similar equation even if the quality of the measurement site is different.

The peripheral length and the quality of the measurement site may be input by the operation unit 2430 or the external memory 2172 before the blood pressure measurement.

When the application voltage is stored in the memory 2123 in association with the user information such as the peripheral length and the quality of the measurement site, the application voltage is corrected based on the user information through a predetermined calculation, and the application voltage is overwritten with the corrected application voltage to store in the memory 2123, so that the pressurization and depressurization control is readjusted according to the change in the peripheral length and quality of the measurement site involved in the change in the constitution of the user, and more appropriately carried out.

Various types of user information such as the peripheral length and the quality of the measurement site may be input before the measurement by arranging a user information input switch 2443 at the input unit such as the operation unit 2430, or by arranging the external memory 2172, so that the information necessary for the calculation of the blood pressure value can be easily acquired in advance, and the time required for the blood pressure measurement can be further reduced.

According to one or more embodiments of the present invention, control may be carried out using a statistical value such as the average value, the minimum value, the maximum value, or the median value of a plurality of stored application voltages.

In this case, a control suited for the user can be carried out as the measurement storage increases.

In this case, an optimization state to the user may be displayed.

Furthermore, the recording value may be a value recorded in the external recording medium (USB memory etc.) or a personal computer, or a server through the Internet. The quality of the measurement site may be measured with a body fat meter connected to the sphygmomanometer.

As described above, the electronic sphygmomanometer 2400 according to one or more embodiments of the present invention includes biological information acquiring means for measuring a blood pressure value, recording means (memory 2123) for recording the blood pressure value, means (memory 2122) for storing a control program of the sphygmomanometer, and the like, operation means (operation unit 2430) for carrying out operations such as the blood pressure measurement, correction means (CPU 2120) for correcting the biological information acquired by the biological information acquiring mean based on separately acquired correction information, and output means (display unit 2121) for outputting the corrected information (blood pressure value) after the correction, a cuff 2101 to be attached to a blood pressure measurement site, pressurization and depressurization means 2104, 2105 for adjusting pressure to apply to the cuff 2101, pressure detection means (pressure sensor 2103) for detecting pressure of the cuff, and blood pressure calculation means (CPU 2120) for calculating the blood pressure value from the cuff pressure being arranged for the biological information acquiring means; the electronic sphygmomanometer 2400 further includes information acquiring means (CPU 2120 that executes step S2405) for acquiring information of an application voltage of a valve 2105 or a pump 2104 at the time of past blood pressure measurement for the correction information, where the correction means (CPU 2120 that executes step S2406) corrects the application voltage based on the information of the application voltage of the valve 2105 or the pump 2104 at the time of the past blood pressure measurement.

According to one or more embodiments of the present invention, the pressurization and depressurization control most suited to the user individual can be carried out. Furthermore, the cuff compliance does not need to be measured and the feedback control is also not necessary, and consequently, shorter measurement time and reduction of unnecessary pressurization can be achieved and the constraining feeling in the blood pressure measurement can be reduced.

The electronic sphygmomanometer 2400 according to one or more embodiments of the present invention includes input means (user information input means 2443) for inputting the user information as described above, where the application voltage of the valve 2105 or the pump 2104 at the time of the blood pressure measurement stored in the recording means (memory 2123) is stored in the recording means (memory 2123) in association with the user information input by the input means (user information input means 2443).

Embodiments of the present invention are not limited only to the above-described embodiments, and a great number of embodiments can be realized.

For example, the electronic sphygmomanometer 2400 may be configured to download an appropriate parameter, threshold value, algorithm, or the like from a dedicated server to expand the function. In this case, the version of the software may be upgraded with the hardware as is, or optimization can be easily realized by the user.

The function expansion of the electronic sphygmomanometer 2400 may be executed from a user terminal such as a personal computer possessed by the user without using the server. In this case, the parameter, the threshold value, the algorithm, and the like may be downloaded from a recording medium such as a CD-ROM.

The electronic sphygmomanometer 2400 may be communicably connected directly wirelessly or by wire to other biological information acquiring device such as a body composition meter, a pedometer, or an electronic thermometer. In this case as well, the data is mutually transmitted and received to enhance the respective precision.

Embodiments of the present invention can be used in an electronic sphygmomanometer adopting an oscillometric method in which a cuff is used, or a microphone method.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS 2400 electronic sphygmomanometer
2101 cuff
2103 pressure sensor
2104 pump
2105 valve
2115 timing unit
2120 CPU
2121 display unit
2122 memory (for processing)
2123 memory (for recording)
2430 operation unit
2442 user selection switch
2443 user information input switch

The invention claimed is:
1. An electronic sphygmomanometer comprising:
a cuff to be attached to a measurement site for measuring a blood pressure;
a pump and a valve that adjust a pressure to apply on the cuff;
a pressure sensor that detects the pressure of the cuff;
a blood pressure calculator that calculates a blood pressure value from the cuff pressure;
a memory that records the blood pressure value;
an operation unit that is configured to carry out a blood pressure measurement;
a body fat meter that measures a quality of the measurement site;
an input device configured to input user information related to the quality of the measurement site,
wherein the quality of the measurement site is a value indicative of a stiffness of an entire volume-area of an arm under the cuff;
an information acquiring device that acquires information on an application voltage of either one of the valve or the pump at a time of blood pressure measurement,
wherein the memory stores the information on the application voltage of the one of the valve or the pump at the time of blood pressure measurement in association with the user information when the information on the application voltage of the one of the valve or the pump at the time of blood pressure measurement is acquired by the information acquiring device; and
a corrector that corrects the application voltage of the one of the valve or the pump based on the user information so that control of the one of the valve or the pump is carried out based on the application voltage in a case where the application voltage associated with the user information is stored in the memory when calculating the blood pressure with the blood pressure calculator.

2. The electronic sphygmomanometer according to claim 1, wherein the memory stores the application voltage of the one of the valve or the pump at the time of the blood pressure measurement in association with the cuff pressure corresponding to the application voltage of the one of the valve or the pump.

3. The electronic sphygmomanometer according to claim 1, wherein the memory stores the application voltage of the one of the valve or the pump at the time of the blood pressure measurement in association with an elapsed time in which the application voltage is applied.

4. The electronic sphygmomanometer according to claim 1,
wherein the memory stores the application voltage of the one of the valve or the pump at the time of the blood pressure measurement in association with user information related to the quality of a measurement site, and
wherein in a case where the user information differs from that stored in the memory in a measurement for this time, the corrector corrects the application voltage based on the user information, and overwrites the application voltage with the corrected application voltage to store in the memory.

5. A blood pressure measurement method using an electronic sphygmomanometer comprising: a cuff; a pump; a valve; a blood pressure calculator; and a pressure sensor, the method for adjusting a pressure to apply on the cuff, which is configured to be attached to a measurement site for measuring a blood pressure, with the pump and the valve, and calculating a blood pressure value with the blood pressure calculator based on a cuff pressure detected by the pressure sensor; the blood pressure measurement method comprising the steps of:
accepting input of user information by an input device,
wherein the user information is related to a quality of the measurement site,
wherein the quality of the measurement site is a value indicative of a stiffness of an entire volume-area of an arm under the cuff, and
wherein the quality of the measurement site is measured using a body fat meter connected to the electronic sphygmomanometer;

acquiring information on an application voltage of a valve and a pump at a time of blood pressure measurement with an information acquiring device;

storing the information on the application voltage of either one of the valve or the pump at the time of blood pressure measurement in a memory in association with the user information when the information on the application voltage of the one of the valve or the pump at the time of blood pressure measurement is acquired by the information acquiring device; and correcting by a corrector the application voltage of the one of the valve or the pump based on the user information so that control of the one of the valve or the pump is carried out based on the application voltage in a case where the information on the application voltage associated with the user information is stored in the memory when calculating the blood pressure with the blood pressure calculator.

6. The blood pressure measurement method according to claim 5, wherein the step of correcting by the corrector comprises storing the application voltage of the one of the valve or the pump at the time of the blood pressure measurement in the memory in association with the cuff pressure corresponding to the application voltage of the one of the valve or the pump.

7. The blood pressure measurement method according to claim 5, wherein the step of correcting by the corrector comprises storing the application voltage of the one of the valve or the pump at the time of the blood pressure measurement in the memory in association with an elapsed time in which the application voltage is applied.

8. The blood pressure measurement method according to claim 5,
wherein the step of correcting by the corrector comprises:
storing the application voltage of the one of the valve or the pump at the time of the blood pressure measurement in association with user information related to the quality of a measurement site; and
correcting the application voltage based on the user information in a case where the user information differs from that stored in the memory in a measurement for this time, and overwriting the user information with the corrected information of the application voltage to store in the memory.

* * * * *